US010715818B2

(12) United States Patent
Holland et al.

(10) Patent No.: US 10,715,818 B2
(45) Date of Patent: Jul. 14, 2020

(54) TECHNIQUES FOR HARDWARE VIDEO ENCODING

(71) Applicant: INTEL CORPORATION, Santa Clara, CA (US)

(72) Inventors: James M. Holland, Folsom, CA (US); Fangwen Fu, Folsom, CA (US); Satya N. Yedidi, Roseville, CA (US); Srinivasan Embar Raghukrishnan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 101 days.

(21) Appl. No.: 15/483,146

(22) Filed: Apr. 10, 2017

(65) Prior Publication Data

US 2018/0041770 A1   Feb. 8, 2018

Related U.S. Application Data

(60) Provisional application No. 62/371,130, filed on Aug. 4, 2016.

(51) Int. Cl.
| H04N 19/176 | (2014.01) |
| H04N 19/523 | (2014.01) |
| H04N 19/146 | (2014.01) |
| H04N 19/103 | (2014.01) |
| H04N 19/43  | (2014.01) |

(52) U.S. Cl.
CPC ......... *H04N 19/176* (2014.11); *H04N 19/103* (2014.11); *H04N 19/146* (2014.11); *H04N 19/43* (2014.11); *H04N 19/523* (2014.11)

(58) Field of Classification Search
CPC .. H04N 19/176; H04N 19/103; H04N 19/523; H04N 19/43; H04N 19/146
USPC ...................................................... 375/240.16
See application file for complete search history.

(56) References Cited

U.S. PATENT DOCUMENTS

| 6,097,832 A | 8/2000 | Guillotel et al. | |
| 6,876,702 B1* | 4/2005 | Hui | H04N 19/51 375/240.16 |
| 6,968,008 B1* | 11/2005 | Ribas-Corbera | H04N 19/56 375/240.16 |
| 6,981,119 B1 | 12/2005 | Lepak et al. | |
| 7,551,673 B1* | 6/2009 | Oh | H04N 19/56 348/413.1 |

(Continued)

FOREIGN PATENT DOCUMENTS

WO   2013095322 A1   6/2013

OTHER PUBLICATIONS

Holland, et al.; "Lossless Pixel Compression for Random Video Memory Access" filed in the United States Patent and Trademark Office as U.S. Appl. No. 15/412,397, filed Jan. 23, 2017.

*Primary Examiner* — Tung T Vo
(74) *Attorney, Agent, or Firm* — International IP Law Group, P.L.L.C.

(57) ABSTRACT

An apparatus of video encoding is described herein. The apparatus includes an encoder and a hardware bit packing unit. The encoder comprises at least a fixed function dual hierarchical motion estimation search units, dual integer motion estimation search units, and a fractional motion estimation search unit. Moreover, the hardware bit packing unit is to pack bits as coded according to the final macroblock coding decision into a data format.

25 Claims, 7 Drawing Sheets

(56) References Cited

U.S. PATENT DOCUMENTS

| | | | |
|---|---|---|---|
| 7,656,561 B2 | 2/2010 | Molgaard et al. | |
| 8,149,915 B1 * | 4/2012 | Novotny | H04N 19/53 |
| | | | 375/240.16 |
| 8,934,544 B1 * | 1/2015 | Wang | H04N 19/176 |
| | | | 375/240.13 |
| 9,330,060 B1 * | 5/2016 | Tsang | H04N 19/43 |
| 9,398,297 B2 | 7/2016 | Gupta | |
| 9,438,923 B2 | 9/2016 | He et al. | |
| 10,068,309 B2 | 9/2018 | Fries et al. | |
| 2001/0021303 A1 * | 9/2001 | Bruls | G06T 3/40 |
| | | | 386/328 |
| 2003/0091114 A1 * | 5/2003 | Vissers | H04N 19/51 |
| | | | 375/240.16 |
| 2003/0229719 A1 * | 12/2003 | Iwata | H04N 19/51 |
| | | | 709/247 |
| 2004/0111627 A1 | 6/2004 | Evans et al. | |
| 2005/0276496 A1 | 12/2005 | Molgaard et al. | |
| 2007/0110160 A1 * | 5/2007 | Wang | H04N 19/56 |
| | | | 375/240.16 |
| 2011/0058606 A1 | 3/2011 | Dencher | |
| 2013/0163671 A1 | 6/2013 | Korman et al. | |
| 2013/0184007 A1 | 7/2013 | Hategan et al. | |
| 2013/0266072 A1 * | 10/2013 | Lee | H04N 19/61 |
| | | | 375/240.16 |
| 2014/0126638 A1 * | 5/2014 | Sievers | H04N 19/567 |
| | | | 375/240.16 |
| 2014/0205012 A1 * | 7/2014 | Lee | H04N 19/42 |
| | | | 375/240.16 |
| 2015/0178077 A1 | 6/2015 | Srinivasan et al. | |
| 2015/0181209 A1 | 6/2015 | Holland et al. | |
| 2015/0264348 A1 | 9/2015 | Zou et al. | |
| 2015/0276496 A1 | 10/2015 | Kellogg et al. | |
| 2015/0279055 A1 | 10/2015 | Kaburlasos et al. | |
| 2016/0073107 A1 | 3/2016 | Moon et al. | |
| 2016/0269747 A1 | 9/2016 | Duenas et al. | |
| 2016/0283391 A1 | 9/2016 | Nilsson et al. | |
| 2016/0353122 A1 | 12/2016 | Krajcevski et al. | |
| 2016/0373741 A1 | 12/2016 | Zhoa et al. | |
| 2017/0076419 A1 | 3/2017 | Fries et al. | |
| 2017/0094274 A1 * | 3/2017 | Chien | H04N 19/124 |
| 2017/0178594 A1 | 6/2017 | Hasselgren et al. | |
| 2017/0256024 A1 | 9/2017 | Abraham et al. | |
| 2017/0345121 A1 | 11/2017 | Seiler | |
| 2018/0063553 A1 | 3/2018 | Zhang et al. | |
| 2019/0110045 A1 | 4/2019 | Zhao et al. | |
| 2019/0260989 A1 | 8/2019 | Racape et al. | |

* cited by examiner

TECHNIQUES FOR HARDWARE VIDEO ENCODING

CROSS REFERENCE TO RELATED APPLICATIONS

The present application claims the benefit of the filing date of U.S. Provisional Patent Application No. 62/371,130, filed Aug. 4, 2016, which is incorporated herein by reference.

BACKGROUND ART

A video stream may be encoded into a variety of video compression formats, or the characteristics of the stream may be changed. Characteristics of the video stream include the resolution and the bit rate of the video stream. Encoding may also be used when preparing the video stream for transmission between devices or components of computing devices.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
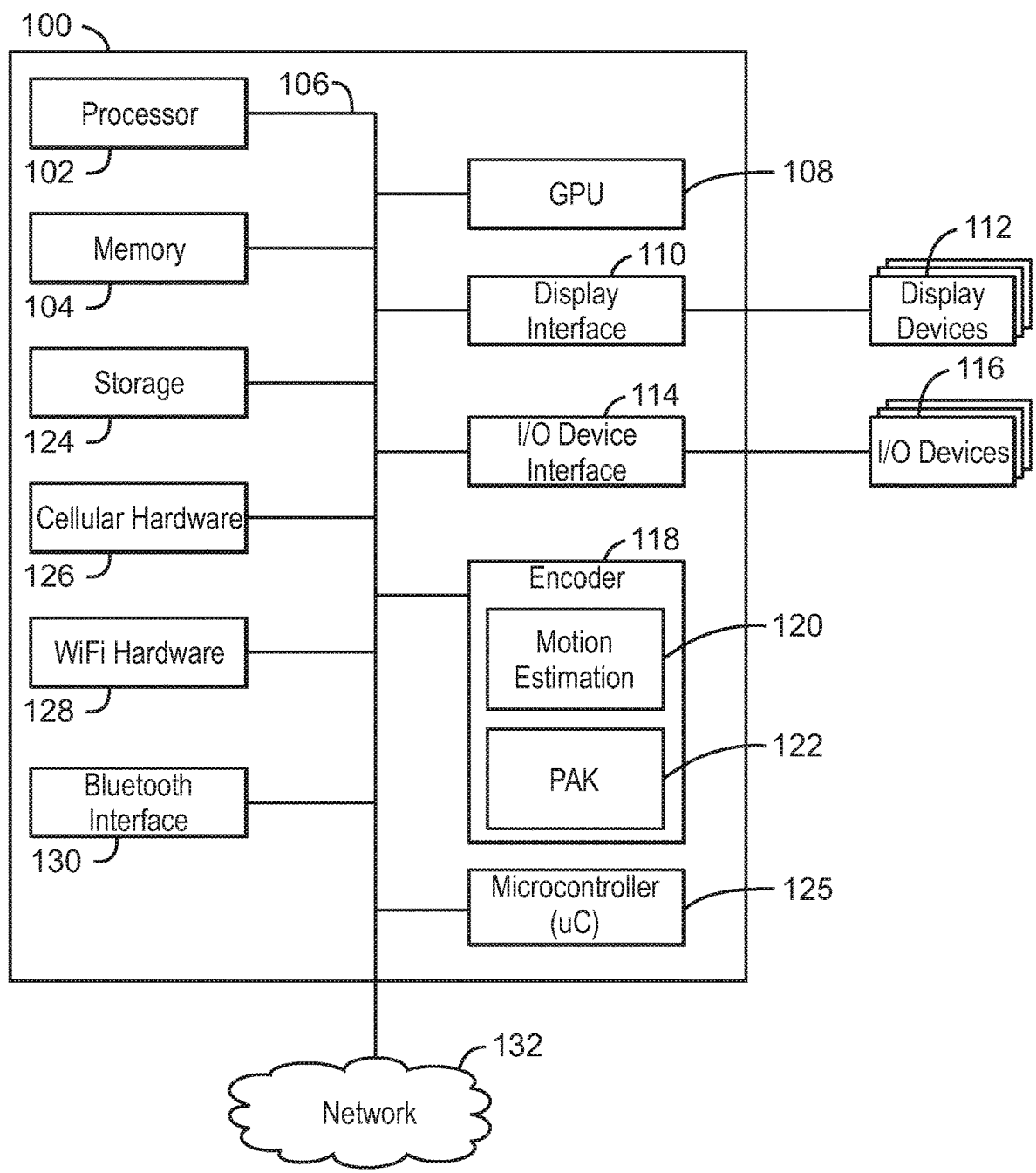
FIG. 1 is a block diagram of a computing device that may be used for transcoding video data, in accordance with embodiments.

The present techniques include multiple techniques for improving the performance, quality, and extensibility of hardware video encoders. Typical solutions have employed multiple programmable engines running kernel programs that use hardware co-processors. In embodiments, the present techniques improve an encoder that is without programmable engines executing the main loop of the encoder algorithms, so-called fixed function encoding. Fixed function encoding is used in phones, tablets, computers, cameras, cars, game systems, and so on to perform a host of encoding tasks for real-time compression of pixels for a multitude of reasons.

The present techniques include, but are not limited to, the following algorithms and techniques. First, a core algorithm for motion estimation, mode decision, and subjective quality enhancements is provided. Second, conditional multi-pass encoding for scene changes is implemented. Third, speculative search centers enable a reduced latency by loading pixel data earlier than classic techniques. Fourth, an external override process controls for omnipotent workloads with a priori knowledge is described. Finally, an adaptive slice termination for network packetization protocols is implemented.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of an electronic device 100 that enables hardware video encoding. The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads. For example, the GPU 108 may include an engine that processes video data via lossless pixel compression.

The CPU 102 can be linked through the bus 106 to a display interface 110 configured to connect the electronic device 100 to a plurality of display devices 112. The display devices 112 can include a display screen that is a built-in component of the electronic device 100. The display devices 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

The computing device 100 may include an encoder 118. The encoder 118 may be a hardware encoder without programmable engines executing within the main loop of an encoder algorithm. In embodiments, this may be referred to as fixed function encoding. Generally, coding video data includes encoding the video to meet proper formats and specifications for recording and playback. Motion estimation is an important and computationally intensive task in video coding and video compression. A motion estimation module 120 may be an algorithm executed by fixed function hardware of the encoder 118. Parameters such as multi-pass packing (PAK) parameters may calculated based on a target size or bit rate by a PAK module 122. In embodiments, the encoder can be used in an iterative fashion to enable conditional multi-pass encoding. The electronic device 100 also includes a microcontroller (uC) 125. The microcontroller 125 may process information that is used to override functions of the encoder 118 or the PAK 120. This override may be enabled through costings and other statistics as described below.

The electronic device may also include a storage device 124. The storage device 124 is a physical memory such as a hard drive, an optical drive, a flash drive, an array of drives, or any combinations thereof. The storage device 124 can store user data, such as audio files, video files, audio/video files, and picture files, among others. The storage device 124 can also store programming code such as device drivers, software applications, operating systems, and the like. The programming code stored to the storage device 124 may be executed by the CPU 102, GPU 108, or any other processors that may be included in the electronic device 100.

The CPU 102 may be linked through the bus 106 to cellular hardware 126. The cellular hardware 126 may be any cellular technology, for example, the 4G standard (International Mobile Telecommunications-Advanced (IMT-Advanced) Standard promulgated by the International Telecommunications Union—Radio communication Sector (ITU-R)). In this manner, the electronic device 100 may access any network 132 without being tethered or paired to another device, where the network 132 is a cellular network.

The CPU 102 may also be linked through the bus 106 to WiFi hardware 128. The WiFi hardware is hardware according to WiFi standards (standards promulgated as Institute of Electrical and Electronics Engineers' (IEEE) 802.11 standards). The WiFi hardware 128 enables the electronic device 100 to connect to the Internet using the Transmission Control Protocol and the Internet Protocol (TCP/IP), where the network 132 is the Internet. Accordingly, the electronic device 100 can enable end-to-end connectivity with the Internet by addressing, routing, transmitting, and receiving data according to the TCP/IP protocol without the use of another device. Additionally, a Bluetooth Interface 130 may be coupled to the CPU 102 through the bus 106. The Bluetooth Interface 130 is an interface according to Bluetooth networks (based on the Bluetooth standard promulgated by the Bluetooth Special Interest Group). The Bluetooth Interface 130 enables the electronic device 100 to be paired with other Bluetooth enabled devices through a personal area network (PAN). Accordingly, the network 132 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

A video or other sequence of visual images may be presented as a series of frames. Motion estimation exploits the redundancy between adjacent frames to achieve compression by selecting a frame as a reference frame and predicting subsequent frames from the reference frame. The prediction may be described by a plurality of motion vectors. The vectors can be encoded and stored or transmitted to a decoder. The type of prediction made for each frame may be referred to as a mode decision. For example, the frames may be encoded based on a forward prediction mode where a future frame is used in the prediction, a backward prediction mode where a previous frame is used in the prediction, or a bidirectional prediction mode that uses both of a previous frame and a future frame for prediction. To determine the particular encoding mode, the mode decision may be made based on the motion estimation. In particular, the output of motion estimation may be used to determine an encoding cost of each different modes that might be applied to encode the current image frame. This may result in selection of the mode that exhibits least cost in one implementation.

The prediction mode may also determine the number of passes made to compress the current frame size into a target frame size. In embodiments, the target frame size is determined by an application or driver. In some cases, several passes are made to determine if the current frame size is equal to the target frame size, wherein a pass is a single iteration through a portion of the encoder that is used to achieve the target frame size. The target frame size may be specified by a rate control module. In embodiments, the number of passes to bring the current frame to the size of the target frame is limited by the mode for each frame. With each pass, a quantization parameter may be modified to achieve the target frame size.

In motion estimation, the current frame in a sequence of frames is predicted, usually from at least one reference frame. The current frame is divided into macroblocks, such that each macroblock is compared to a region in the reference frame of the same size using an error measure, and the best matching region is selected. The search is conducted over a search area. A motion vector denoting the displacement of the region in the reference frame with respect to the macroblock in the current frame is determined. The present techniques use multiple reference frames as downscaled references which are searched to provide candidates for a full resolution search. Moreover, motion estimation of subsequent blocks can be made prior to a complete mode decision being made on a previous block. Such a motion estimation is made as a heuristic of an approximate or pseudo prediction, which could violate the precise decoder specification but is close enough for the encoder and encoding decisions in the majority of macroblocks.

The prediction mode may also determine the number of passes made to compress the current frame size into a target frame size. The present techniques may enable a first encoding attempt in view of a scene change, and limit the passes to a second attempt if specific targets (such as target frame size) were not met during the first attempt. Further, overrides may be implemented as hints to the encoder to enhance decision making.

Figure 2:
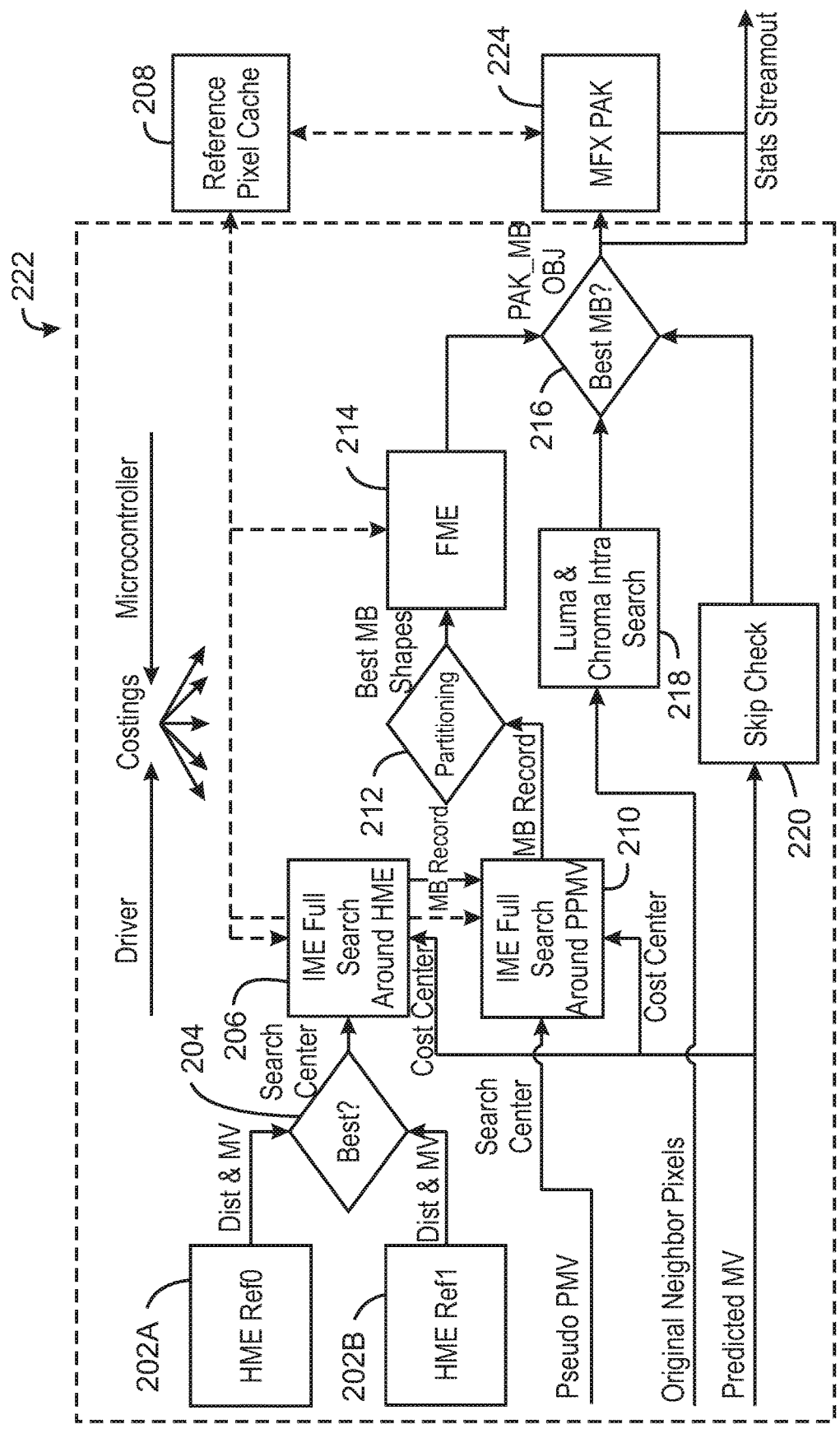
FIG. 2 is a block diagram of an encoder algorithm according to the present techniques.

FIG. 2 is a block diagram of an encoder algorithm 200 according to the present techniques. The topology of the encoder algorithm 200 is broken into multiple stages in FIG. 2. At blocks 202A and 202B, a hierarchical motion estimation (HME) search may be performed to obtain multiple references. Multiple references are provided as downscaled references which are searched with to provide candidates for a full resolution IME search. In embodiments, HME may be performed on each frame in order to determine the motion vectors for each frame. Motion estimation is a technique in which the movement of objects in a sequence of frames is analyzed to obtain vectors that represent the estimated motion of the object between frames. In embodiments, the frame is divided into macroblocks, and the motion vectors represent the change in position of a macroblock between frames. A macroblock is typically a block of pixels. For example, a macroblock could be sixteen by eight pixels in size.

An HME search involves performing coarse searches for motion vectors for each frame to determine an estimated motion vector for each macroblock within the frame. The initial estimated motion vectors may be refined by performing additional searches at a finer level of granularity. For example, the macroblocks may be searched at various resolutions, from coarse to fine levels of granularity, in order to determine the motion vectors. Other HME searching techniques may include, but are not limited to, changing the size of the macroblocks when searching for motion vectors.

In embodiments, bit rate control may be applied to each frame in order to create frames that meet the frame size of the encoding format of the target video stream. The various video compression formats use a stated bit rate for a video stream, and the bit rate is the number of bits per second that are present when the video is played. Bit rate control is done by determining the ideal quantization parameters for the frame to result in the target frame size.

Block 202A and block 202B take as input a full resolution macroblock and scales down the resolution to a fourth, an eighth, or higher resolution. The motion estimation is then performed with the scaled down resolution. This results in a performance advantage as opposed to doing the search at the full resolution which would be very power performance intensive. As illustrated, the HME is performed using two references. In embodiments, the two references may be the two frames tat immediately precede frame N, such as frame N−1 and frame N−2. In other embodiments, the two references may be frame N−1 and a long term reference frame. As used herein, a long term reference frame is a high quality encoded frame that was processed within a predetermined number of frames ago. For example, the long term reference may be a very good quality encoded frame from 100 frames ago. The output of this dual HME search is a pair of reduced precision motion vectors. While two HME searches are illustrated, the HME search may be performed using a plurality of reference frames resulting in a multi-reference HME search.

Once multiple references and a distance have been provided at blocks 202A and 202B as downscaled references, the best reference frame is determined at block 204. To determine the best reference frame, motion vectors from each downscaled reference search are compared and the frame with a lowest prediction error is selected as the search candidate for integer motion estimation at block 206. At block 206, an integer motion estimation (IME) full search is performed using the HME results.

The IME search at block 206 uses the reduced precision motion vector found during the dual HME search to obtain a precise motion vector. The IME search is to compare all values of various block sizes for the coding units of the current frame with that of integer pixels in a search area of a reference image frame. In embodiments, the IME is to find the best inter-prediction mode with the least rate distortion cost via a cost center input. Instead of searching the entirety of multiple reference frames, in embodiments the first IME search is limited to the area defined by the best reference frame from the HME search. In embodiments, to reduce system bandwidth, a common reference pixel cache 208 is shared for motion estimation during the encoding phase along with the complimentary motion compensation during the bitstream and reconstructed picture generation phase.

A second IME search is performed at block 210 using a pseudo predicted motion vector (PPMV). The second IME search is based on the predicted or approximately predicted motion vector so that motion estimation of subsequent blocks can begin without waiting for previous coding units to make a mode decision and initialize motion estimation of the subsequent blocks. The pseudo PMV can be used on the fly, as needed. The results of the full IME search block 206 may be sent to the IME search 210.

Thus, the second IME search at block 210 is an additional full resolution search based on a partial result of the previous macroblock's motion. In embodiments, the second IME search uses information from the first IME search to predict motion vectors of another macroblock. For example, if the previous macroblock had success with the motion vector of (−50, −50) then there is a good chance that this macroblock will also have success around (−50, −50), assuming the current macroblock is a part of the same moving object. Thus, the two IME searches use two different techniques to determine motion. The first search is a full searching approach based on the HME search without any kind of information from neighboring macroblocks. The second search makes an assumption that a neighboring macroblock has success with a particular motion vector somewhere then the current macroblock may have success with the same motion vector. In embodiments, a third search can be provided from an external process which can also have partial results combined with the first or second search.

During the search at block 210, many different sized block shapes are individually optimized allowing for partitioning to identify the best combination of shapes to represent this macroblock. In this manner, bottlenecks do not occur at the fixed function IME searched. At block 212, the partitioning may partition the macroblock into pixel coding units. The best macroblock shapes obtained after the partitioning step 212 may be further searched at block 214.

Partitioning at block 212 may be based on a macroblock record (MB record). The macroblock record is an enumeration of every single shape within a macroblock, such as a 16×16 macroblock. Various coding standards have multiple block sizes that could be selected such as 16×16, 8×8, 4×4s and so on. During the IME searches 206 and 210, some of the candidates found in the first full search can be combined with other candidates from the second full search. The macroblock record keeps track of the macroblock shapes and depending on the motion vectors found, some macroblocks can be combined via partitioning.

In embodiments, a fractional motion estimation (FME) at block 214 may be executed based on the image frame and/or partition information. In embodiments, those selected macroblock candidates with their motion vectors are further searched in the fractional motion resolution. After partitioning, the resulting motion vectors are now at an integer resolution. In other words, the motion vectors for each macroblock shape are per pixel. Various coding specifications specify resolutions halfway between pixels or even quarter resolutions between pixels to be more precise. This is because an object moving from frame to frame does not move a whole pixel between the two frames. Instead, it may move only half a pixel. These half, fractional resolutions enable this motion to be captured.

The macroblocks resulting from the FME at block 214 are then compared at block 216 to macroblocks from a luma and chroma search at block 218 as well as a skip check at block 220. At block 214, the best inter-candidate macroblocks have been determined. A best intra-candidate is derived by exhaustively searching all allowed prediction angles from spatial neighboring macroblocks at block 218. The allowed prediction angles may be can be limited below or up to the full quantity of angles specified by the video standard. At block 218 the luma and chroma intra search may be performed based on spatial neighboring macroblocks. The resulting macroblocks are derived by exhaustively searching all allowed prediction angles from a spatially predictive neighbor. In embodiments, the final candidate from block 218 is derived from the final states of neighboring macroblocks to predict a so-called skip macroblock's location which requires the least bits possible for the decoder to process.

At block 220 the skip check is used to derive a final macroblock for comparison at block 216. In embodiments, the macroblock candidate at block 220 is found using the final states of neighboring macroblocks to predict a so called skip macroblock location based on a predicted motion vector (PMV).

The pseudo PMV (PPMV) is used to speed up the IME by estimating the results of the predicted motion vector (PMV). In embodiments, the PPMV is used at the IME stage. However, the skip is not approximated because approximating the skip may cause corruptions in decoding. Thus, the actual predicted motion vector is used for the skip check 220. Once the neighbor's motion vector has been calculated, the PMV is calculated and then a determination is made on if the PMV is a good candidate at block 216.

The comparison at block 216 between the two macroblock candidates output at block 214 and block 216 may be overridden by applying a skip check at block 220 to the predicted motion vector. A skip check may determine when encoding for the macroblock should be skipped, such that no vector information for a given macroblock is generated. The skip check is confirmed when the current macroblock follows the same motion pattern as the neighboring macroblocks, whether they are static or following translation motion. In the case of a skip, the best macroblock at block 216 is null and no information is generated for the current macroblock. A statistics stream out is generated at block 216 and may include various parameters that are gathered during encoding and can be returned to memory for use by another process or to tune the encoder further for better compression or quality.

At block 224, a hardware bit packing (PAK) unit is to pack bits as coded according to the mode decision into a data format. In embodiments, the data is formatted according to a particular video standard. Video standards include, but are not limited to, AVC, VP8, H.264, MPEG-4, and VC-1, etc. In embodiments, the results are binarized into the different video formats based on the encoder mode selection. The results include a bitstream which can be accurately and uniquely decoded by following the video standard. The encoder mode selection yields a plurality of mode decisions, wherein a mode decision refers to how the encoder represents each macroblock. The encoder mode selection is to make the best return-on-investment possible, as in encoding the least number of bits with the highest amount of quality.

As illustrated, the PAK 224 receives and transmits data to/from the reference pixel cache 208. Thus, the reference pixel cache is a shared cache between the encoding process described by blocks 222 and the PAK 224. During encoding motion estimation and motion compensation occurs, where motion estimation is the process of searching for the best motion vector and motion compensation is the process of taking a specified motion vector and then predicting pixels at the location of the motion vector that can then be used for encoding. Each of the encoding 222 and PAK 224 processes loads pixels for processing. Specifically, the encoding process loads pixels for searching and determining the motion vectors, and the PAK processes pixels to apply motion to the location specified by the motion vectors. The reference pixel cache 208 is a common cache that both of those two processes can read/write data. Thus, in embodiments, when data is first loaded for encoding those pixels remain in the reference pixel cache long enough for the PAK process 224 to find each specific pixel needed for motion compensation. In embodiments, this shared reference pixel cache prevents loading/transmitting the pixels twice.

FIG. 2 includes various costings that can be applied to each decision made at blocks 202-224. A software driver may have information that is used to override any of the functions described in FIG. 2 through costings. Moreover, a microcontroller may also have information that is used to override any of the functions described in FIG. 2 through costings. In embodiments, the costings may be weights and controls that are used to essentially bias decisions throughout the process. For example, in the final best macroblock at block 216, the FME candidates are compared with the luma and chroma inter-candidates, and the skip candidates. In some cases, the raw numbers that are derived and used for comparison at block 216 may result in a best macroblock that would not be selected when information is available that could influence the macroblock choice. In embodiments, some a priori knowledge or pre-determined values may suggest if the three candidates are close, then always take the skip as the best choice. These costings result in a programmable weight from some other source. The costings can be then distributed throughout FIG. 2 to bias decisions and selections at each search or decision. The costings enable a high degree of programmability with each searching function, even when fixed function hardware units are used. Thus, the present techniques enable a high degree of reusability for different applications.

In embodiments, an inter-search for macroblocks is performed within the current frame at blocks 202A, 202B, 204, 206, 2010 and 214. An intra-search is performed at block 218, and the skip check processes one location to determine if a skip should be applied. These three components result in motion estimation in mode decision. The mode decision occurs at block 216 and is fed forward to the PAK 224. The PAK 224 converts the mode decision to the binary code associated with the best mode decision.

As discussed above, the costings can be used to create a re-configurable encoding pipeline. In embodiments, various costings and/or parameters can be used to bias the mode decisions during encoding. Parameters such as the quantization parameter (QP) can be adjusted to bias the mode selection based on different content types, available bandwidth, resolution, targeted codec and bit budgets. In embodiments, for subjective video optimization, each QP can be adjusted for each macroblock individually to promote quality in some cases and hide visual artifacts in regions that are less visible. Put another way, the QP as a costing enables a direct control feedback loop where by changing the QP bias up or down, the present techniques can very clearly improve how the user perceives a video quality by increasing artifacts where the user is not looking and decreasing artifacts where the user is looking. Multiple stages of user programmable thresholds are used to control the QP. A Stage1 QP is based on the relative distortion of this block to the rest of the frame in quartiles. Each quartile has its own change in QP or deltaQP. A Stage2 QP is based on mode specific information, such as the intra-prediction mode type or the motion vector length for inter-prediction. A Stage3 QP is based on a user-specified region of interest map with multiple levels of associated deltaQPs. Each delta is combined and clamped if necessary before and after combination with the sliceQP.

In cases where a integer QP value produces a frame that significantly exceeds a target bit budget and one QP higher integer value produces a frame that significantly undershoots the target bit budget, a fractional precision QP between the two nearest integer QP values may be used and the lower and higher integer QP values may be proportionally assigned throughout the frame so that the average of the macroblock QP for the entire frame allows for more accurate results to meet the target bit budget with a lesser amount of overshoot and undershoot.

In embodiments, a quantization parameter is a value that is used to divide the coefficients of the current frame in order to obtain values for the target frame size. A higher quantization parameter may result in more zero coefficients that do not have to be encoded to reduce the bitrate at the expense of quality. Accordingly, the frames may be sized in such a manner that the number of bits per frame comports with the bit rate of the encoding format of the target video stream. In some cases, an encoder may perform motion estimation again to determine the finer motion vectors and macroblock types of the frames after the bit rate control has been applied to each frame. Once new motion vectors, quantization parameters, and macroblock types have been determined, the frames may be encoded in to a final compressed video stream in the target video compression format.

Figure 3:
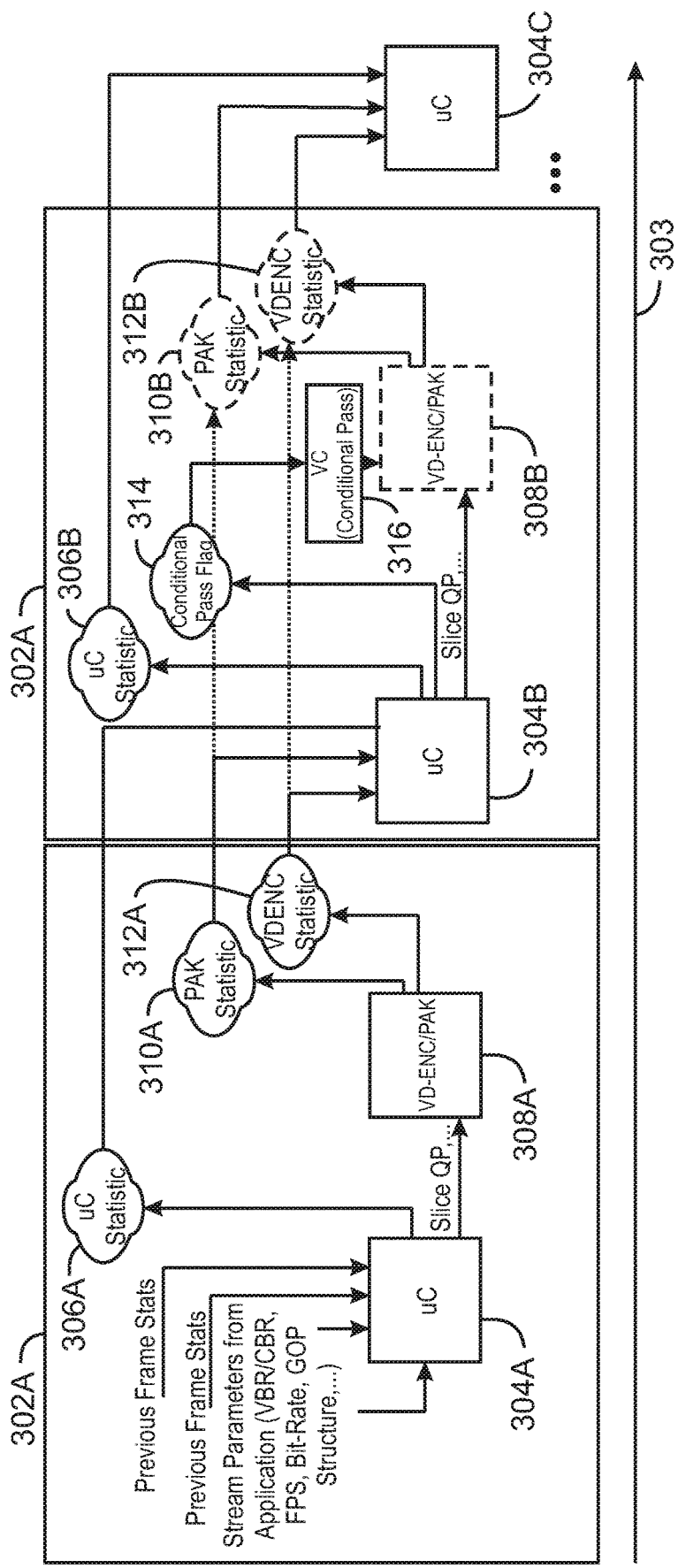
FIG. 3 is a block diagram of collecting statistics via a single pass mode and/or a 2-pass adaptive mode.

FIG. 3 is a block diagram illustrating a method 300 for the collection of statistics via a single pass mode and/or a two-pass adaptive mode. In FIG. 3, a feedback loop based on various statistics is described with a first loop 302A and a second loop 302B. A timeline 303 illustrates the progression of time from the loop 302A, to the loop 302B. While only two loops are described, the present techniques may execute any number of loops to converge of the best encoder mode decision for the particular media content. At block 304A, a microcontroller takes as inputs controls such as previous frame statistics and stream parameters, such as variable bit rate (VBR), constant bit rate (CBR), frames per second (FPS), bit rate, group of pictures (GOP) structure, and the like. Using this information, the microcontroller at 304A may determine a microcontroller statistic 306A. The microcontroller at 304A also sends a slice QP to the encoder/bit backing at block 308A. Each slice QP is a self-sustained unit of compressed video data and has no dependency with its neighbors. A quantization parameter may be associated with each slice.

Those controls are accepted by the hardware, which performs its task all the way down to the bit stream generation at the encoder/bit backing at block 308A. While the encoder/bit backing at block 308A generates the encoded bit stream, statistics are also generated. Some statistics are generated during the encode (ENC) part of the process at block 312A, and some are generated from the PAK process at block 310A.

In embodiments, the statistics stored during the first loop are stored in memory such that the second time the microcontroller 304 iterates at loop 302B, the microcontroller statistics 306A, PAK statistics 310A, and encoder statistics 312A will be used by the microcontroller 304B at the second loop to set a conditional pass flag at 314. Thus, in embodiments, the microcontroller statistics 306A and 306B include information about the rate control accuracy such as how the rate control buffer is being managed and whether or not the encoding process is accurately meeting predetermined budgets. This information is propagated forward as the latest up-to-date rate control information.

Further, the sliceQP output by the microcontroller 304 may be used to determine if a conditional pass occurs. The conditional pass at block 316 is a portion of the hardware and is used to determine whether or not the conditional pass flag at 314 has been written to or not due to the encoder mode selection that occurred in the first loop 302A meeting all requirements that are needed when the first loop was executed. If all requirements were met in the first loop 302A, the second loop 302B checks to ensure that everything met the requirements. If so, then the conditional pass flag will be set at 314, and a conditional pass performed at block 316, with no need to do any additional tasks.

In embodiments, a conditional multi-pass method comprises a single pass mode 302 and a two-pass adaptive mode. During the coding process, a multi-format encode/decode engine may provide a hardware-accelerated media data encode and decode. In particular, each pass may be executed by fixed function hardware-accelerated media data encode and decode components. In embodiments, the encode/decode engine is a stateless engine in that it does not retain any history of settings (states) for the encoding/decoding process of an image. Hence, a driver issues a full set of a state command sequences prior to processing each new frame.

On the other hand, if the encoder mode decisions at the end of the first loop 302A exceeded the criteria and the budgets that were set forth, then the second loop 302B would detect the violation and update the statistics at blocks 306B, 3106, and 3128. Moreover, the conditional flag 314 would be marked as needing to repeat processing of the current frame. In embodiments, the sliceQP parameter is modified to bring the encoder mode decisions within the target budget. The controls of the second loop 302B would be different than the controls specified by 302A, because if the exact controls were used the same exact encoder mode decisions would result in the same decisions, which would not meet the requirements.

Put another way, if the first loop 302A generates a frame that is outside of budget requirements in any other way, then the sliceQP can be set by the second loop 302B to make the next attempt result in a frame size within the particular encoding requirements. When the second loop 302B is executed, a new round of statistics for the PAK 310B and ENC 312B are obtained that negate and overwrite the statistics at block 310A and 312A from the first loop 302A. Thus, the ENC/PAK 308B, PAK statistic 310B and ENC statistic 312B are represented with dashed lines, as they are optional steps based on results from the previous loop 302A. While the sliceQP is used as an exemplary control, any control may be used to bring the target frame within requirement dictated by a particular encoding scheme. The controls, may be for example, sliceQP or any other mode costing. In embodiments, a threshold may be a control that will dynamically control the hardware throughput by reducing the pipelining, which in turn increases the accuracy of the mode decision boundary or skip.

Figure 4:
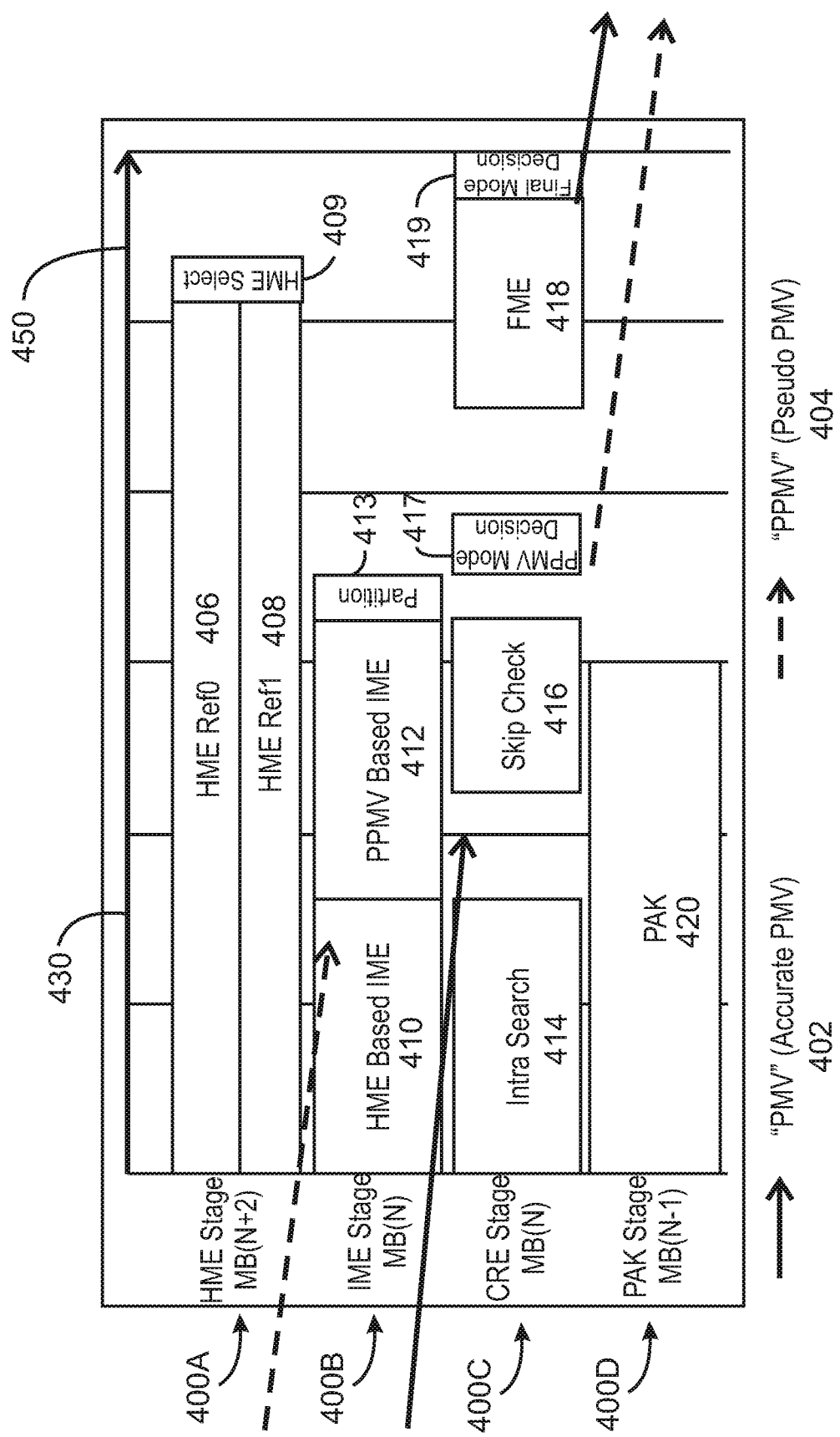
FIG. 4 is a timing diagram for hardware video encoding.

FIG. 4 is a timing diagram illustrating the propagation of motion vectors to initialize the motion estimation and subsequent encoding according to the present techniques. The processing in FIG. 4 occurs in a periodic fashion during each duty cycle as represented by the timeline 450, where time increases as indicated by the arrow along the timeline 450. Motion estimation generally depends on the mode decisions of previous macroblocks. However, waiting for each coding block (macroblock) to complete their mode decisions before initializing the motion estimation of subsequent blocks may result in reduced performance. The present techniques use a pseudo predicted motion vector to initialize motion estimation for subsequent blocks, where the accurate predicted motion vector is used during later calculations, when available.

In embodiments, a pseudo predicted motion vector (pseudo PMV) is derived based on the assumption that the current macroblock will select an inter-predicted macroblock type. The PMV calculation can then occur which prepares the search center for the next macroblock, reducing the impact of memory latency. Additionally, the PPMV.x component is incremented by the width of one macroblock to assume the following macroblock will be processed at the location of the current macroblock and the translation lookaside buffer (TLB) is prefetched for this location to reduce the likelihood of a TLB miss. The accurate PMV is used in calculations at the end once the final mode decision of the current block is known to ensure the following macroblock uses the accurate PMV for costing and skip check.

Consider frame N as a current frame for processing. In the example of FIG. 4, frame N is at an IME Stage 400B and undergoes processing by the IME pipeline with an HME based IME search at block 410 using the PPMV 404. At the time frame N begins an HME based IME search, Stage 400A executes a dual HME search on frame N+2 at blocks 406 and 408. Stage 400C is a CRE Stage, where the intra-predicted search 414 and skip check is applied to frame N. At the same time, frame N−1 enters the PAK stage 400D, where the mode decisions from the previous stages 400A, 400B, and 400C are converted to the binary code associated with the selected best mode decision.

The HME based IME is performed using the HME results as in block 206 of FIG. 2. Another IME search at 410 is performed using the PPMV 404 represented by the dashed lines in FIG. 4, similar to the IME search at block 208 (FIG. 2). Partitioning 413 is performed, similar to the partitioning at block 212 of FIG. 2. At the same time as stage 400B, stage 400C executes an intra-predicted search 414 similar to block 218 of FIG. 2. A skip check 416 is performed and is similar to block 220 of FIG. 2. A PPMV mode decision is made at block 417. Note that the PMV 402 becomes available at approximately the 30% marking on the timeline 450, as illustrated at reference number 430. Thus, at block 418, the FME may be performed using the PMV 402, and a final mode decision 419 is made using the PMV 402. Since the PPMV is incremented by the width of one macroblock and the TLB is prefetched for this macroblock location, the likelihood of a TLB miss during the final mode decision using the PMV is reduced. The accurate PMV 402 is checked again at the end once the final mode decision of the current block is known to ensure the following macroblock uses the accurate PMV 402 for costing and skip check.

FIG. 4 illustrates the timing of processing macroblocks at different stages. The timing may apply to the processing described in FIG. 2. As described in FIG. 2, some macroblock information is dependent on other macroblocks. For example, the HME based IME processing at block 206 (FIG. 2) cannot begin until the previous HME at blocks 202A and 202B is finished. The HME search can be performed two macroblocks ahead because it has no dependency on other macroblocks. However, the PPMV based IME 412 may be timing critical because the previous macroblocks accurate PMV is not known until the after the final mode decision is made at block 419. In embodiments, the IME full search is completed using the PPMV. Using the PPMV avoids delaying the full IME search waiting for a PMV. If the IME full search was delayed until a PMV was available, the partitioning 413 would be delayed which would then delay the FME, which in turn would then propagate the delay further to the next maroblock's processing.

FIG. 4 illustrates some processes described in FIG. 2 that execute in parallel across multiple macroblocks. In some cases, the PPMV is derived at block 417 prior to the fractional motion estimation at block 418. Thus, if the IME results are very good, those IME results are better than the skip at block 416. Notice that the intra-predicted search 414 is done prior to the skip check 416, as there is a degree of dependency between the intra-search and the skip check. Thus, immediately prior to the FME at block 418, the intra-search at block 414 and the skip check at block 416 have been executed so once the IME search is complete through blocks 410, 412, and 413, these three values can be compared to make the best macroblock decision earlier than the completion of the FME 418. In examples, it is likely that if the IME is the best macroblock decision when compared to the intra-search candidate and the skip check according to a frame budget and frame requirements, then further FME processing at 418 will only increase the accuracy of the inter-search over the intra-search and the skip check. Accordingly, in FIG. 4 the timing enables a search location to be determined without having to wait for the final mode decision to be derived.

Figure 5:
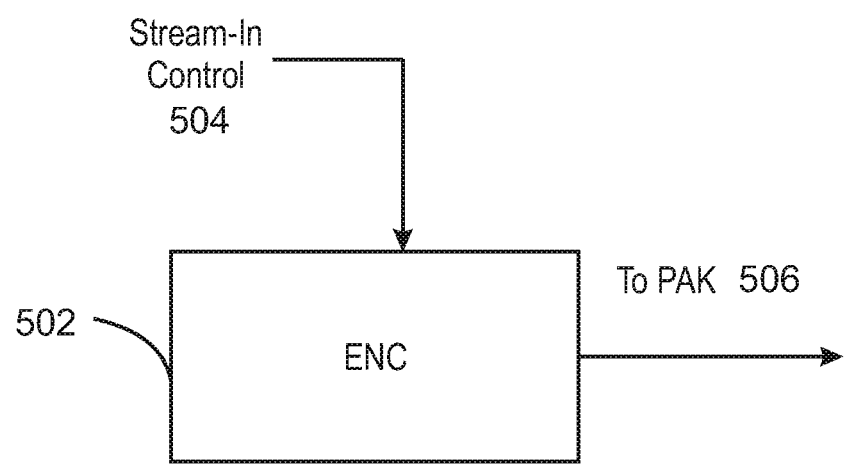
FIG. 5 is an illustration of a black box encoder.

FIG. 5 is an illustration of a hardware encoder 502. Stream in control 504 is provided to the encoder. The hardware encoder as described herein may be a black-box wherein an external process such as a software driver or microcontroller extends the capabilities of the encoder via costings, special hints, or controls the hardware encoder will honor. The stream-in control 504 is similar to costings and enables a third party process to bias and control every individual macroblock. The stream-in control can be applied to each function, similar to the costings described in FIG. 2. For example, one of the stream-in controls might force the intra-search as the best mode decision. This control would be applied to block 216 (FIG. 2). In some cases, an additional search candidate can be provided via a third search, an importance rank (region of interest) can be specified, the mode decision can be forced to skip, intra—predict or let the hardware decide, the QP (quantization parameter) can be forced, or other rate control parameters applied to the encoding process.

In embodiments, a pointer may be generated by an external process and provided to the encoder 502. Overrides (costings, special hints, or controls) such as an additional IME search predictor may also be used. In embodiments, a third IME search center x, y (beyond HME and PPMV) may be provided. This enables an even larger search range. Additionally, a region of interest control may also be provided for dynamic macroblock QP adjustments. Moreover, a force type may be skip, intra, or let the encoder decide. A force QP may be used, or the encoder may determine the QP. Additionally, rate control panic controls may be used.

In some cases, the user can provide bit budget thresholds for which each slice is targeting to not exceed. Because the hardware encoder is pipelined for performance, there may be some feedback delay from where the bits are accumulated to where the encoder makes important slice termination calculations. The user can specify one threshold which dynamically will slow the hardware by reducing the pipelining which increases the accuracy of the slice termination boundary or the user can skip that threshold which will increase performance but decrease the precision of the slice termination behavior.

Figure 6:
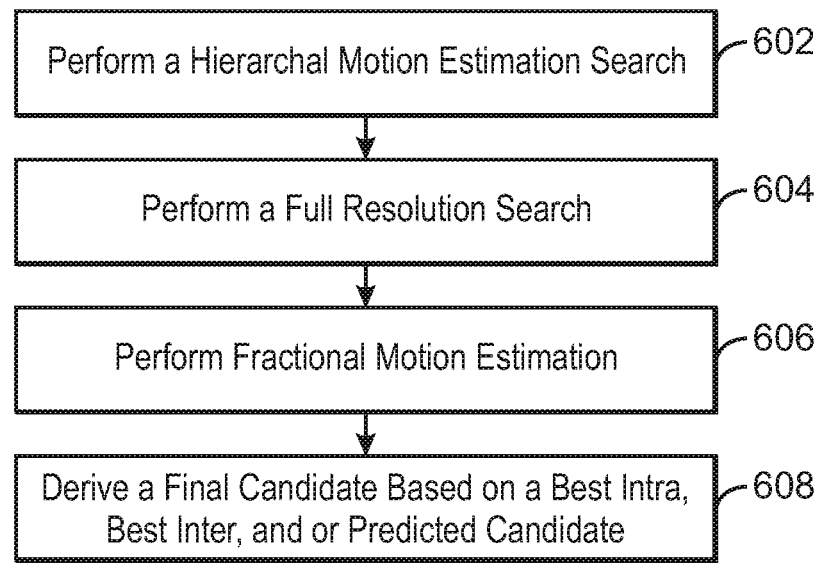
FIG. 6 is a process flow diagram for hardware video encoding.

FIG. 6 is a process flow diagram of a method 600 to enable hardware encoding. At block 602, a hierarchal motion estimation search is performed. In embodiments, the hierarchal motion estimation search is performed using downscaled references. At block 604, a full resolution integer motion estimation search is performed. The integer motion estimation search may be executed using the hierarchal motion estimation search results and a pseudo predicted motion vector. At block 606, fractional motion estimation is performed to determine a best inter-predicted macroblock candidate. At block 608, a final candidate best macroblock candidate is determined from the best inter-predicted candidate, the best intra-predicted candidate, and a skip check.

Figure 7:
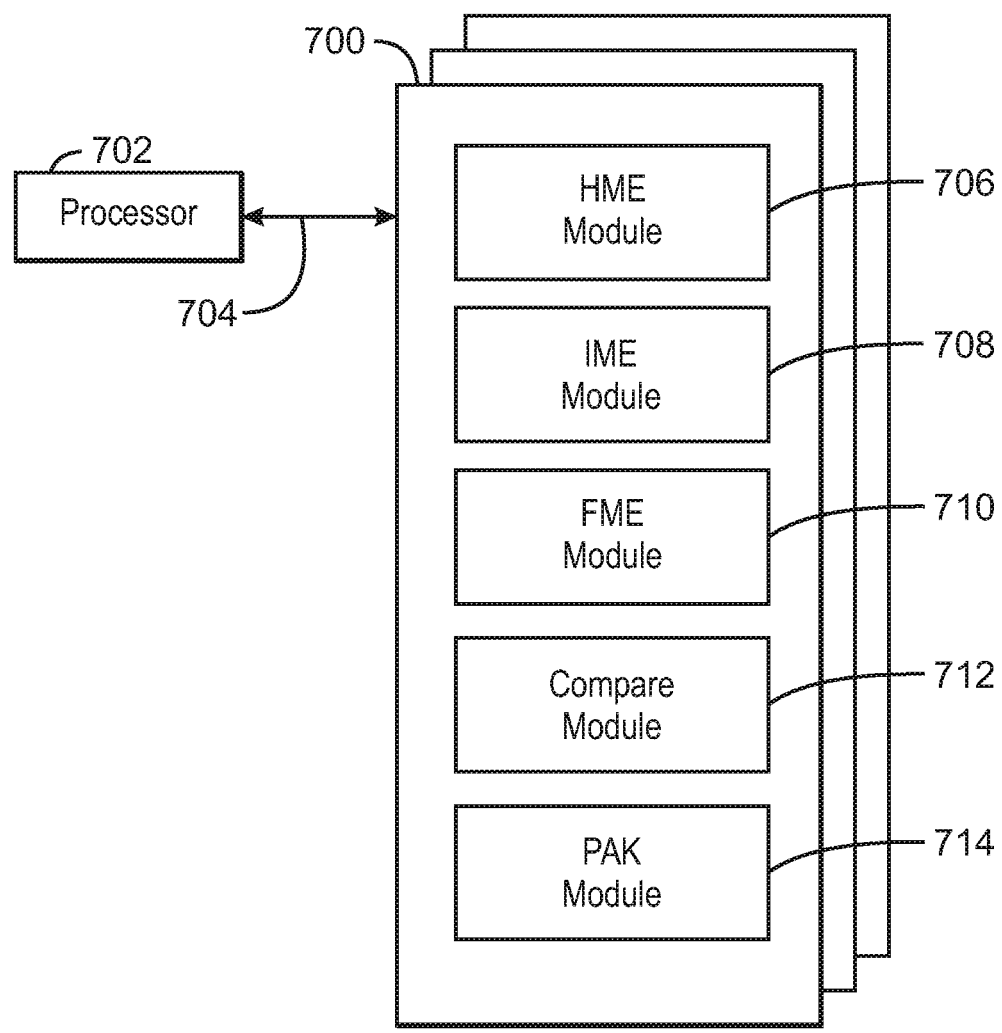
FIG. 7 is a block diagram showing a medium that contains logic for hardware video encoding.

FIG. 7 is a block diagram showing a medium 700 that contains logic for hardware video encoding. The medium 700 may be a computer-readable medium, including a non-transitory medium that stores code that can be accessed by a processor 702 over a computer bus 704. For example, the computer-readable medium 700 can be volatile or non-volatile data storage device. The medium 700 can also be a logic unit, such as an Application Specific Integrated Circuit (ASIC), a Field Programmable Gate Array (FPGA), or an arrangement of logic gates implemented in one or more integrated circuits, for example.

The medium 700 may include modules 706-714 configured to perform the techniques described herein. For example, an HME module 706 may be configured to determine an encoding mode based on a downscaled motion estimation search. An IME module 708 may be configured execute dual IME searches. A first IME search may be based on the results of the dual HME search. A second IME search may be based on a PPMV. An FME module 710 may be configured to determine a best inter-predicted encoder mode decision based on the dual HME searches and the dual IME searches. A compare module 712 may be configured to compare the macroblock decisions to select a final best macroblock encode decision. In embodiments, the best inter-predicted encoder mode decision is compared to a best intra-predicted encoder mode decision and a skip check. Finally, at block 714, a PAK module packs bits into packets corresponding to the best final encoder mode decision for consumption by a consumer.

The block diagram of FIG. 7 is not intended to indicate that the medium 700 is to include all of the components shown in FIG. 7. Further, the medium 700 may include any number of additional components not shown in FIG. 7, depending on the details of the specific implementation.

Encoder algorithms must reduce a practically unlimited number of syntax and tool combinations defined by a specification into a single option that all decoders are able to understand. The present techniques result in an option that uses the least amount of power, or provides the most amount of video fidelity, or the most amount of compression, or some combination of these metrics. In embodiments, the present techniques focus on video compression at 4K resolution in low power with subjective video quality enhancements.

Additionally, the present techniques include a conditional multi-pass that enables for the first attempt at encoding a video frame be the only attempt or allow for a second or more attempts if specific targets were not satisfied with the first attempt. This enables reduced power consumption over solutions that employ multiple attempts for all frames or limit frames to single attempts for all frames. Other solutions that wait for each coding block (macroblock) to complete their mode decisions before initializing the motion estimation of subsequent blocks have reduced performance when compared to the present techniques.

A so-called fixed function hardware encoder can be limiting if it is solely responsible to make all syntax decisions. With the present techniques, a user can feed special hints or overrides that can direct the encoder algorithm to make different decisions, search in additional locations, or alter the subjective quality of a given region that the hardware encoder would not be aware of with information only present in the pixel data available at the time of encoding. Additionally, while slice termination can be achieved slowly by processing one block at a time, the pipelined approach of the present techniques enables performance to be maintained while adaptively terminating slices on-the-fly when reaching a specified bit budget.

Example 1 is a system for video encoding. The system includes an encoder, wherein the encoder comprises a plurality of fixed function hardware units comprising at least a hierarchical motion estimation unit, an integer motion estimation unit, and a fractional motion estimation unit, wherein when the encoder is to execute the plurality of fixed function hardware units, the plurality of fixed function hardware units are operable to: execute a dual hierarchical motion estimation search; execute a dual integer motion estimation search based on at least the results of the hierarchical motion estimation search; and execute a fractional motion estimation search to determine a best inter-predicted macroblock coding decision; a memory that is to store instructions and that is communicatively coupled to the encoder; and a processor communicatively coupled to the encoder and the memory, wherein when the processor is to execute the instructions, the processor is to: compare the best inter-predicted macroblock coding decision, an intra-predicted macroblock coding decision, and a skip to determine a final macroblock coding decision.

Example 2 includes the system of example 1, including or excluding optional features. In this example, the final macroblock coding decision is a macroblock coding decision that requires the least bits for encoding.

Example 3 includes the system of any one of examples 1 to 2, including or excluding optional features. In this example, costings are applied to the plurality of fixed function units of the encoder to bias a function executed by each fixed function unit. Optionally, the costings are weights or controls used to bias encoder mode decisions. Optionally, the costings are a processor override to always select one of the best inter-predicted macroblock coding decision, the intra-predicted macroblock coding decision, or the skip as the final macroblock coding decision based on pre-determined values Example 4 includes the system of any one of examples 1 to 3, including or excluding optional features. In this example, a microcontroller applies a plurality of costings to the plurality of fixed function units of the encoder to bias a function executed by each fixed function unit.

Example 5 includes the system of any one of examples 1 to 4, including or excluding optional features. In this example, a software driver applies a plurality of costings to the plurality of fixed function units of the encoder to bias a function executed by each fixed function unit.

Example 6 includes the system of any one of examples 1 to 5, including or excluding optional features. In this example, the encoder executes in an iterative fashion to implement a conditional multi-pass flag until the best inter-predicted encoder mode decision is within a specified requirement.

Example 7 includes the system of any one of examples 1 to 6, including or excluding optional features. In this example, the integer motion estimation is executed using a pseudo predicted motion vector.

Example 8 includes the system of any one of examples 1 to 7, including or excluding optional features. In this example, the pseudo predicted motion vector is derived based on an assumption that the current macroblock will select an inter-predicted macroblock type or an intra-predicted macroblock type prior to the fractional motion estimation search.

Example 9 is a method for hardware video encoding. The method includes performing a multi-reference hierarchical motion estimation search; performing a multi-reference integer motion estimation search based on at least the results of the hierarchical motion estimation search; and executing a fractional motion estimation search to determine a best inter-predicted macroblock coding decision; and comparing the best inter-predicted macroblock coding decision, an intra-predicted macroblock coding decision, and a skip candidate to determine a final macroblock coding decision.

Example 10 includes the method of example 9, including or excluding optional features. In this example, costings are applied to the multi-reference hierarchical motion estimation search, the multi-reference integer motion estimation search, and the fractional motion estimation search to bias a function executed by each fixed function unit.

Example 11 includes the method of any one of examples 9 to 10, including or excluding optional features. In this example, the costings comprise a quantization parameter, and the quantization parameter is adjusted via multiple stages of user programmable thresholds.

Example 12 includes the method of any one of examples 9 to 11, including or excluding optional features. In this example, the dual hierarchical motion estimation search is executed on a pair of down sampled macroblock references.

Example 13 includes the method of any one of examples 9 to 12, including or excluding optional features. In this example, the pair of down sampled macroblock references are obtained from two immediately preceding frames.

Example 14 includes the method of any one of examples 9 to 13, including or excluding optional features. In this example, partitioning is applied to the results of the dual integer motion estimation search to identify a best combination of shapes to represent a current macroblock.

Example 15 includes the method of any one of examples 9 to 14, including or excluding optional features. In this example, the intra-predicted macroblock coding decision is determined by exhaustively searching a plurality of allowed prediction angles from spatial neighboring macroblocks.

Example 16 includes the method of any one of examples 9 to 15, including or excluding optional features. In this example, the skip candidate is determined based on a final macroblock coding decision from a plurality of neighboring macroblocks. Optionally, the final macroblock coding decision from the plurality of neighboring macroblocks is derived via a predicted motion vector.

Example 17 includes the method of any one of examples 9 to 16, including or excluding optional features. In this example, the method includes generating a statistics stream out, wherein the statistics stream out is applied to subsequent encoder macroblock coding decisions as costings to tune an encoder for better compression or quality.

Example 18 includes the method of any one of examples 9 to 17, including or excluding optional features. In this example, the method includes a bit packing (PAK) unit to pack bits as coded according to the final macroblock coding decision into a data format.

Example 19 includes the method of any one of examples 9 to 18, including or excluding optional features. In this example, the dual hierarchical motion estimation search, dual integer motion estimation search, and fractional motion estimation search are performed iteratively until the best inter-predicted macroblock coding decision meets a predetermined requirement.

Example 20 is an apparatus for video encoding. The apparatus includes an encoder, wherein the encoder comprises fixed function dual hierarchical motion estimation search units, fixed function dual integer motion estimation search units, and a fixed function fractional motion estimation search unit, wherein a plurality of statistics are captured via a two-pass adaptive mode and the statistics are applied to the fixed function dual hierarchical motion estimation search units, the fixed function dual integer motion estimation search units, and the fixed function fractional motion estimation search unit to achieve a target compression; and a hardware bit packing (PAK) unit, wherein the hardware bit packing unit is to pack bits as coded according to the final macroblock coding decision into a data format.

Example 21 includes the apparatus of example 20, including or excluding optional features. In this example, the dual hierarchical motion estimation search units are to determine a macroblock coding decision based on a pair of down sampled reference frames.

Example 22 includes the apparatus of any one of examples 20 to 21, including or excluding optional features. In this example, the dual hierarchical motion estimation search units are to determine a macroblock coding decision based on a longstanding reference frame.

Example 23 includes the apparatus of any one of examples 20 to 22, including or excluding optional features. In this example, the dual integer motion estimation search units are to determine a macroblock coding decision based on at least a result of the dual hierarchical motion estimation search units.

Example 24 includes the apparatus of any one of examples 20 to 23, including or excluding optional features. In this example, the fractional motion estimation search unit is to determine a best inter-predicted macroblock coding decision.

Example 25 includes the apparatus of any one of examples 20 to 24, including or excluding optional features. In this example, the apparatus includes a reference pixel cache that is used by the encoder to access data to encode, wherein the same data remains in the reference pixel cache long enough for the hardware bit packing unit to access pixel data for motion compensation.

Example 26 includes the apparatus of any one of examples 20 to 25, including or excluding optional features. In this example, the fixed function dual hierarchical motion estimation search units, dual integer motion estimation search units, and the fractional motion estimation search unit of the encoder are re-configurable via on costings applied to the encoder. Optionally, the costings comprise values to bias the fixed function dual hierarchical motion estimation search units, dual integer motion estimation search units, and a fractional motion estimation search unit. Optionally, the costings are obtained from a microcontroller. Optionally, the costings are obtained from a software driver.

Example 27 is a tangible, non-transitory, computer-readable medium. The computer-readable medium includes instructions that direct the processor to performing a multi-reference hierarchical motion estimation search; performing a multi-reference integer motion estimation search based on at least the results of the hierarchical motion estimation search; and executing a fractional motion estimation search to determine a best inter-predicted macroblock coding decision; and comparing the best inter-predicted macroblock coding decision, an intra-predicted macroblock coding decision, and a skip candidate to determine a final macroblock coding decision.

Example 28 includes the computer-readable medium of example 27, including or excluding optional features. In this example, costings are applied to the multi-reference hierarchical motion estimation search, the multi-reference integer motion estimation search, and the fractional motion estimation search to bias a function executed by each fixed function unit.

Example 29 includes the computer-readable medium of any one of examples 27 to 28, including or excluding optional features. In this example, the costings comprise a quantization parameter, and the quantization parameter is adjusted via multiple stages of user programmable thresholds.

Example 30 includes the computer-readable medium of any one of examples 27 to 29, including or excluding optional features. In this example, the dual hierarchical motion estimation search is executed on a pair of down sampled macroblock references.

Example 31 includes the computer-readable medium of any one of examples 27 to 30, including or excluding optional features. In this example, the pair of down sampled macroblock references are obtained from two immediately preceding frames.

Example 32 includes the computer-readable medium of any one of examples 27 to 31, including or excluding optional features. In this example, partitioning is applied to the results of the dual integer motion estimation search to identify a best combination of shapes to represent a current macroblock.

Example 33 includes the computer-readable medium of any one of examples 27 to 32, including or excluding optional features. In this example, the intra-predicted macroblock coding decision is determined by exhaustively searching a plurality of allowed prediction angles from spatial neighboring macroblocks.

Example 34 includes the computer-readable medium of any one of examples 27 to 33, including or excluding optional features. In this example, the skip candidate is determined based on a final macroblock coding decision from a plurality of neighboring macroblocks. Optionally, the final macroblock coding decision from the plurality of neighboring macroblocks is derived via a predicted motion vector.

Example 35 includes the computer-readable medium of any one of examples 27 to 34, including or excluding optional features. In this example, the computer-readable medium includes generating a statistics stream out, wherein the statistics stream out is applied to subsequent encoder macroblock coding decisions as costings to tune an encoder for better compression or quality.

Example 36 includes the computer-readable medium of any one of examples 27 to 35, including or excluding optional features. In this example, the computer-readable medium includes a bit packing (PAK) unit to pack bits as coded according to the final macroblock coding decision into a data format.

Example 37 includes the computer-readable medium of any one of examples 27 to 36, including or excluding optional features. In this example, the dual hierarchical motion estimation search, dual integer motion estimation search, and fractional motion estimation search are performed iteratively until the best inter-predicted macroblock coding decision meets a predetermined requirement.

Example 38 is an apparatus for video encoding. The apparatus includes instructions that direct the processor to an encoder, wherein the encoder comprises fixed function dual hierarchical motion estimation search units, fixed function dual integer motion estimation search units, and a fixed function fractional motion estimation search unit, wherein a means to bias the fixed function dual hierarchical motion estimation search units, the fixed function dual integer motion estimation search units, and the fixed function fractional motion estimation search unit is to achieve a target compression; and a hardware bit packing (PAK) unit, wherein the hardware bit packing unit is to pack bits as coded according to the final macroblock coding decision into a data format.

Example 39 includes the apparatus of example 38, including or excluding optional features. In this example, the dual hierarchical motion estimation search units are to determine a macroblock coding decision based on a pair of down sampled reference frames.

Example 40 includes the apparatus of any one of examples 38 to 39, including or excluding optional features. In this example, the dual hierarchical motion estimation search units are to determine a macroblock coding decision based on a longstanding reference frame.

Example 41 includes the apparatus of any one of examples 38 to 40, including or excluding optional features. In this example, the dual integer motion estimation search units are to determine a macroblock coding decision based on at least a result of the dual hierarchical motion estimation search units.

Example 42 includes the apparatus of any one of examples 38 to 41, including or excluding optional features. In this example, the fractional motion estimation search unit is to determine a best inter-predicted macroblock coding decision.

Example 43 includes the apparatus of any one of examples 38 to 42, including or excluding optional features. In this example, the apparatus includes a reference pixel cache that is used by the encoder to access data to encode, wherein the same data remains in the reference pixel cache long enough for the hardware bit packing unit to access pixel data for motion compensation.

Example 44 includes the apparatus of any one of examples 38 to 43, including or excluding optional features. In this example, the fixed function dual hierarchical motion estimation search units, dual integer motion estimation search units, and the fractional motion estimation search unit of the encoder are re-configurable via costings applied to the encoder. Optionally, the costings comprise the means to bias the fixed function dual hierarchical motion estimation search units, the fixed function dual integer motion estimation search units, and the fixed function fractional motion estimation search unit. Optionally, the costings are obtained from a microcontroller. Optionally, the costings are obtained from a software driver.

It is to be understood that specifics in the aforementioned examples may be used anywhere in one or more embodiments. For instance, all optional features of the electronic device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for video encoding, comprising:
an encoder, wherein the encoder comprises a plurality of fixed function hardware units comprising at least a hierarchical motion estimation unit, an integer motion estimation unit, and a fractional motion estimation unit, wherein when the encoder is to execute the plurality of fixed function hardware units, the plurality of fixed function hardware units is operable to:
execute a multiple reference hierarchical motion estimation search on a plurality of reference frames;
execute a first integer motion estimation search based on at least the results of the multiple reference hierarchical motion estimation search to obtain a precise motion vector and a second integer motion estimation search using a pseudo predicted motion vector and the precise motion vector;
partition a current macroblock based on the second integer motion estimation search; and
execute a fractional motion estimation search based on the current macroblock partitioning to determine a best inter-predicted macroblock coding decision;
a memory that is to store instructions and that is communicatively coupled to the encoder; and
a processor communicatively coupled to the encoder and the memory, wherein when the processor is to execute the instructions, the processor is to:
compare the best inter-predicted macroblock coding decision, an intra-predicted macroblock coding decision, and a skip to determine a final macroblock coding decision, wherein the intra-predicted macroblock coding decision is derived from a spatial neighboring macroblock and the skip is based on a predicted motion vector.

2. The system of claim 1, wherein the final macroblock coding decision is a macroblock coding decision that requires the least bits for encoding.

3. The system of claim 1, wherein costings are applied to the plurality of fixed function units of the encoder to bias a function executed by each fixed function unit.

4. The system of claim 3, wherein the costings are weights or controls used to bias encoder mode decisions.

5. The system of claim 3, wherein the costings are a processor override to always select one of the best inter-predicted macroblock coding decision, the intra-predicted macroblock coding decision, or the skip as the final macroblock coding decision based on pre-determined values.

6. The system of claim 1, wherein a microcontroller applies a plurality of costings to the plurality of fixed function units of the encoder to bias a function executed by each fixed function unit.

7. The system of claim 1, wherein a software driver applies a plurality of costings to the plurality of fixed function units of the encoder to bias a function executed by each fixed function unit.

8. The system of claim 1, wherein the encoder executes in an iterative fashion to implement a conditional multi-pass flag until the best inter-predicted encoder mode decision is within a specified requirement.

9. The system of claim 1, wherein the integer motion estimation is executed using a pseudo predicted motion vector.

10. The system of claim 1, wherein the pseudo predicted motion vector is derived based on an assumption that the current macroblock will select an inter-predicted macroblock type or an intra-predicted macroblock type prior to the fractional motion estimation search.

11. A method for hardware video encoding, comprising:
performing a multi-reference hierarchical motion estimation search;
performing a first integer motion estimation search based on at least the results of the multiple reference hierarchical motion estimation search to obtain a precise motion vector and a second integer motion estimation search using a pseudo predicted motion vector and the precise motion vector;
partitioning a current macroblock based on the second integer motion estimation search;
executing a fractional motion estimation search based on the current macroblock partitioning to determine a best inter-predicted macroblock coding decision; and
comparing the best inter-predicted macroblock coding decision, an intra-predicted macroblock coding decision, and a skip candidate to determine a final macroblock coding decision, wherein the intra-predicted macroblock coding decision is derived from a spatial neighboring macroblock and the skip is based on a predicted motion vector.

12. The method of claim 11, wherein costings are applied to the multi-reference hierarchical motion estimation search, the multi-reference integer motion estimation search, and the fractional motion estimation search to bias a function executed by each fixed function unit.

13. The method of claim 11, wherein the costings comprise a quantization parameter, and the quantization parameter is adjusted via multiple stages of user programmable thresholds.

14. The method of claim 11, wherein the multi-reference hierarchical motion estimation search is executed on a pair of down sampled macroblock references.

15. The method of claim 11, wherein the pair of down sampled macroblock references are obtained from two immediately preceding frames.

16. The method of claim 11, wherein partitioning is applied to the results of the multi-reference integer motion estimation search to identify a best combination of shapes to represent a current macroblock.

17. The method of claim 11, wherein the intra-predicted macroblock coding decision is determined by exhaustively searching a plurality of allowed prediction angles from spatial neighboring macroblocks.

18. The method of claim 11, wherein the skip candidate is determined based on a final macroblock coding decision from a plurality of neighboring macroblocks.

19. An apparatus for video encoding, comprising:
an encoder, wherein the encoder comprises:
a fixed function multiple reference hierarchical motion estimation search unit to perform a hierarchical motion estimation search on a plurality of reference frames;
a fixed function first integer motion estimation search unit to perform a search based on at least the results of the multiple reference hierarchical motion estimation search to obtain a precise motion vector, and a second fixed function integer motion estimation unit to perform a search using a pseudo predicted motion vector and the precise motion vector; and
a fixed function fractional motion estimation search unit, wherein a plurality of statistics is captured via a two-pass adaptive mode and the plurality of statistics is applied to the fixed function multiple reference hierarchical motion estimation search unit, the fixed function first integer motion estimation search unit, the second fixed function integer motion estimation unit, and the fixed function fractional motion estimation search unit to achieve a target compression and a final macroblock coding decision is made by comparing a best inter-predicted macroblock coding decision, an intra-predicted macroblock coding decision, and a skip candidate; and
a hardware bit packing (PAK) unit, wherein the hardware bit packing unit is to pack bits as coded according to a final macroblock coding decision into a data format.

20. The apparatus of claim 19, wherein the multiple reference hierarchical motion estimation search units is to determine a macroblock coding decision based on a pair of down sampled reference frames.

21. The apparatus of claim 19, wherein the multiple reference hierarchical motion estimation search unit is to determine a macroblock coding decision based on a long-standing reference frame.

22. The apparatus of claim 19, wherein the first integer motion estimation search unit and the second fixed function integer motion estimation unit are to determine a macroblock coding decision based on at least a result of the multiple reference hierarchical motion estimation search unit.

23. The apparatus of claim 19, wherein the fractional motion estimation search unit is to determine the best inter-predicted macroblock coding decision.

24. The apparatus of claim 19, comprising a reference pixel cache that is used by the encoder to access data to encode, wherein the same data remains in the reference pixel cache long enough for the hardware bit packing unit to access pixel data for motion compensation.

25. The apparatus of claim 19, wherein the fixed function multiple reference hierarchical motion estimation search unit, first integer motion estimation search unit, second fixed function integer motion estimation unit, and the fractional motion estimation search unit of the encoder are re-configurable via on costings applied to the encoder.

* * * * *